US012303936B2

(12) United States Patent
Clevenger et al.

(10) Patent No.: US 12,303,936 B2
(45) Date of Patent: May 20, 2025

(54) METHOD OF PHOTOGRAFTING ORGANIC MOLECULES TO METALLIC SUBSTRATES AND DEVICES HAVING PHOTOGRAFTED ORGANIC MOLECULES

(71) Applicant: Quatssant, LLC, Monmouth Junction, NJ (US)

(72) Inventors: Randell Clevenger, North Plainfield, NJ (US); Gordon D. Donald, Oceanport, NJ (US)

(73) Assignee: Quatssant, LLC, Monomouth Junction, NJ (US)

( * ) Notice: Subject to any disclaimer, the term of this patent is extended or adjusted under 35 U.S.C. 154(b) by 69 days.

(21) Appl. No.: 16/727,439

(22) Filed: Dec. 26, 2019

(65) Prior Publication Data

US 2020/0206776 A1 Jul. 2, 2020

Related U.S. Application Data

(60) Provisional application No. 62/785,162, filed on Dec. 26, 2018.

(51) Int. Cl.

| | |
|---|---|
| ***B05D 3/06*** | (2006.01) |
| ***B05D 1/02*** | (2006.01) |
| ***B05D 7/14*** | (2006.01) |
| *B05D 3/10* | (2006.01) |

(52) U.S. Cl.

CPC ............... *B05D 3/067* (2013.01); *B05D 1/02* (2013.01); *B05D 7/14* (2013.01); *B05D 3/102* (2013.01); *B05D 2202/10* (2013.01); *B05D 2202/35* (2013.01); *B05D 2350/60* (2013.01); *B05D 2502/005* (2013.01)

(58) Field of Classification Search

CPC . B05D 3/067; B05D 1/02; B05D 7/14; B05D 3/102; B05D 2202/10; B05D 2202/35; B05D 2350/60; B05D 2502/005

See application file for complete search history.

(56) References Cited

U.S. PATENT DOCUMENTS

| | | | |
|---|---|---|---|
| 3,105,826 | A | 10/1963 | La Barre |
| 3,907,865 | A | 9/1975 | Miyata et al. |
| 4,166,776 | A | 9/1979 | Lefebvre et al. |
| 5,032,237 | A | 7/1991 | Wiserman et al. |
| 5,102,507 | A | 4/1992 | Wieserman et al. |
| 5,126,210 | A | 6/1992 | Wieserman et al. |
| 5,277,788 | A | 1/1994 | Nitowski et al. |

(Continued)

OTHER PUBLICATIONS

Shin et al. "Surface properties of silica nanoparticles modified wtih polymers for polymer nanocomposite applications" Journal of Industrial and Engineering Chemistry 14 (2008) 515-519.*

(Continued)

*Primary Examiner* — Robert S Walters, Jr.
(74) *Attorney, Agent, or Firm* — Schwegman Lundberg & Woessner, P.A.

(57) ABSTRACT

A method of photografting organic molecules to a metal oxide comprising: (a) contacting a substrate having a metal oxide layer on a surface thereof with an acrylate, derivative thereof or a photolabile functional group; and (b) exposing the metal oxide layer and the acrylate, derivative thereof or photolabile group to UV or visible radiation to form covalent bonds between the metal oxide and the acrylate, the derivative thereof or the photolabile.

18 Claims, 1 Drawing Sheet

(56) References Cited

U.S. PATENT DOCUMENTS

| | | | | |
|---|---|---|---|---|
| 6,146,767 | A | 11/2000 | Schwartz | |
| 6,303,278 | B1 * | 10/2001 | Larsson | H05K 3/185 430/315 |
| 6,645,644 | B1 | 11/2003 | Schwartz et al. | |
| 7,396,594 | B2 | 7/2008 | Schwartz et al. | |
| 7,507,483 | B2 | 3/2009 | Schwartz et al. | |
| 7,569,285 | B2 | 8/2009 | Schwartz et al. | |
| 7,815,963 | B2 | 10/2010 | Schwartz et al. | |
| 7,879,456 | B2 | 2/2011 | Schwartz et al. | |
| 7,931,943 | B2 | 4/2011 | Schwartz et al. | |
| 8,092,585 | B2 | 1/2012 | Schwartz et al. | |
| 8,993,479 | B2 | 3/2015 | Zuilhof et al. | |
| 9,868,808 | B2 | 1/2018 | Clevenger et al. | |
| 10,390,533 | B2 | 8/2019 | Clevenger | |
| 10,499,750 | B2 | 10/2019 | Caicedo-Carvajal et al. | |
| 2006/0073280 | A1 | 4/2006 | Bauer et al. | |
| 2008/0206443 | A1 | 8/2008 | Schwartz et al. | |
| 2009/0004481 | A1 | 1/2009 | Schwartz et al. | |
| 2010/0167072 | A1 | 7/2010 | Chouai et al. | |
| 2010/0215643 | A1 | 8/2010 | Clevenger et al. | |
| 2011/0100081 | A1 | 5/2011 | Rau et al. | |
| 2015/0132470 | A1 | 5/2015 | Namba | |
| 2016/0168725 | A1 | 6/2016 | Pfirrmann et al. | |
| 2017/0224882 | A1 * | 8/2017 | Clevenger | A01N 25/08 |
| 2017/0292064 | A1 | 10/2017 | Monroe et al. | |

OTHER PUBLICATIONS

Muller et al. "Influences of protein films on antibacterial or bacteria-repellent surface coatings in a model system using silicon wafers" Biomaterials 30 (2009) 4921-4929.*

Anitha et al., Synthesis, characterization, cytotoxicity and antibacterial studies of chitosan, O-carboxymethyl and N,O-carboxymethyl chitosan nanoparticles, Carbohydrate Polymers, 2009, 78, pp. 672-677.

Arnold et al., Efficacy of i-Factor Bone Graft versus Autograft in Anterior Cervical Discectomy and Fusion, Spine, 2016, vol. 41, No. 13, pp. 1075-1083.

Borchard, Chitosans for gene delivery, Advanced Drug Delivery Reviews, 2001, 52, pp. 145-150.

Dubey et al., Characterization of self-assembled organic films using differential charging in X-ray photoelectron spectroscopy, Langmuir, 2006, 22 (10), pp. 4649-4653.

Dubey et al., Structure and Order of Phosphonic Acid-Based Self-Assembled Monolayers on Si(100), Langmuir, 2010, 26 (18), pp. 14747-14754.

Franking et al., Highly Stable Molecular Layers on Nanocrystalline Anatase TiO2 through Photochemical Grafting, Langmuir, 2009, 25 (18), pp. 10676-10684.

Galoppini, Linkers for anchoring sensitizers to semiconductor nanoparticles, Coordination Chemistry Reviews (2004), 248, pp. 1283-1297.

Gao et al., Solid-State Nmr-Studies of Self-Assembled Monolayers, Langmuir, 1995, 11, pp. 1860-1863.

Gawalt et al., Enhanced bonding of alkanephosphonic acids to oxidized titanium using surface-bound alkoxyzirconium complex interfaces, Langmuir, 1999, 15 (26), pp. 8929-8933.

Gawalt et al., Enhanced bonding of organometallics to titanium via a titanium(III) phosphate interface, Langmuir, 2001; 17 (21), pp. 6743-6745.

Gawalt et al., Self-assembly and bonding of alkanephosphonic acids on the native oxide surface of titanium, Langmuir, 2001; 17 (19), pp. 5736-5738.

Gouzman et al., Monolayer vs. multilayer self-assembled alkylphosphonate films: X-ray photoelectron spectroscopy studies, Surface Science, 2006; 600, pp. 773-781.

Hanson et al., Bonding self-assembled, compact organophosphonate monolayers to the native oxide surface of silicon, J. Am. Chem. Soc., 2003, 125 (51), pp. 16074-16080.

Hirano et al., Effects of chitosan, pectic acid, lysozyme, and chitinase on the growth of several phytopathogens, Agricultural and Biological Chemistry, 1989, 53 (11), pp. 3065-3066.

International Search Report and Written Opinion dated Jun. 25, 2019 in related Application No. PCT/US19/27330 filed Apr. 12, 2019 (9 pages).

International Search Report and Written Opinion dated Apr. 28, 2020 in related Application No. PCT/US19/68579 filed Dec. 26, 2019 (19 pages).

Jayakumar et al., Bioactive and metal uptake studies of carboxymethyl chitosan-graft-D-glucuronic acid membranes for tissue engineering and environmental applications, International Journal of Biological Macromolecules, 2009, 45, pp. 135-139.

Jayakumar et al., Chitosan conjugated DNA nanoparticles in gene therapy, Carbohydrate Polymers, 2010, 79, pp. 1-8.

Jayakumar et al., Novel chitin and chitosan nanofibers in biomedical applications, Biotechnology Advances, 2010, 28, pp. 142-150.

Jennings et al., Chitosan Based Biomaterials, vol. 1: Fundamentals, 2017, Elsevier (323 pages).

Jennings et al., Chitosan Based Biomaterials, vol. 2: Tissue Engineering and Therapeutics, 2017, Elsevier (278 pages).

Kasaj et al., Clinical evaluation of anorganic bovine-derived hydroxyapatite matrix/cell-binding peptide (P-15) in the treatment of human infrabony defects., Clin Oral Invest, 2008, 12, pp. 241-247.

Liu et.al., Covalent attachment of P15 peptide to titanium surfaces enhances cell attachment, spreading, and osteogenic gene expression, Journal of Orthopaedic Research, 2012, pp. 1-9.

Madhumathi et al., Development of novel chitin/nanosilver composite scaffolds for wound dressing applications, Journal of Materials Science: Materials in Medicine, 2010, 21, pp. 807-813.

Prabaharan, Review paper: chitosan derivatives as promising materials for controlled drug delivery, Journal of Biomaterials Applications, 2008, 23, pp. 5-36.

Pubchem, Substand Record for SID 234146215, available Feb. 12, 2015, retrieved Mar. 30, 2020, https://pubchem.ncbi.nlm.nih.gov/substance/234146215.

Pujari et al., Covalent Surface Modification of Oxide Surfaces, Angew. Chem. Int. Ed. (2014), 53, pp. 2-36.

Sherman et al., Evaluation of ABM/P-15 versus autogenous bone in an ovine lumbar interbody fusion model., Eur Spine J, 2010, 19, pp. 2156-2163.

Tiwari et al., Electrochemical synthesis of chitosan-co-polyaniline/WO3-nH2O composite electrode for amperometric detection of NO2 gas, Electroanalysis 20, 2008, 16, pp. 1775-1781.

Weber et al., Glycosylidene Carbenes, Helvetica Chimica Acta, 1998, 81, pp. 1359-1372.

Woodward et al., Self-assembled monolayer growth of octadecylphosphonic acid on mica, Langmuir, 1996, 12, pp. 3626-3629.

Yukna et al., Multi-center clinical evaluation of combination anorganic bovine-derived hydroxyapatite matrix (ABM)/cell binding peptide (P-15) as a bone replacement graft material in human periodontal osseous defects. 6-month results., J Periodontol. 1998, 69, pp. 655-663.

Yukna et al., Thirty-six month follow-up of 25 patients treated with combination anorganic bovine-derived hydroxyapatite matrix (ABM)/cell-binding peptide (P-15) bone replacement grafts in human infrabony defects. I. Clinical findings., J Periodontol. 2002, 73, pp. 123-128.

Xu et al., "Preparation, Characterization of UV-Curable Waterborne Polyurethane-Acrylate and the Application in Metal Iron Surface Protection," J. Appl. Polym. Sci, vol. 130, pp. 3142-3152 (2013).

Patel et al., "Preparation and performance of UV curable polyurethane coating for metal surfaces," Arc. Apl. Sci. Res, vol. 1 (2), pp. 294-305 (2009).

Liu et al.,"Synthesis of New Biobased Antibacterial Methacrylates Derived from Tannic Acid and Their Application in UV-Cured Coatings," Ind. Eng. Chem. Res, vol. 53, pp. 10835-10840 (2014).

Ghosh et al., "Selective laser melted titanium alloys for hip implant applications: Surface modification with new method of polymer grafting," Journal of the Mechanical Behavior of Biomedical Materials, vol. 87, pp. 312-324 (2018).

(56) References Cited

OTHER PUBLICATIONS

Srivastava et al.,"UV curable polyurethane acrylate coatings for metal surfaces," Pigment & Resin Technology, vol. 37 No. 4, pp. 217-223 (2008).

Fukazawa et al.,"Synthesis of Photoreactive Phospholipid Polymers for Use in Versatile Surface Modification of Various Materials to Obtain Extreme Wettability," ACS Appl. Mater. Interfaces, vol. 5, pp. 6832-6836 (2013).

* cited by examiner

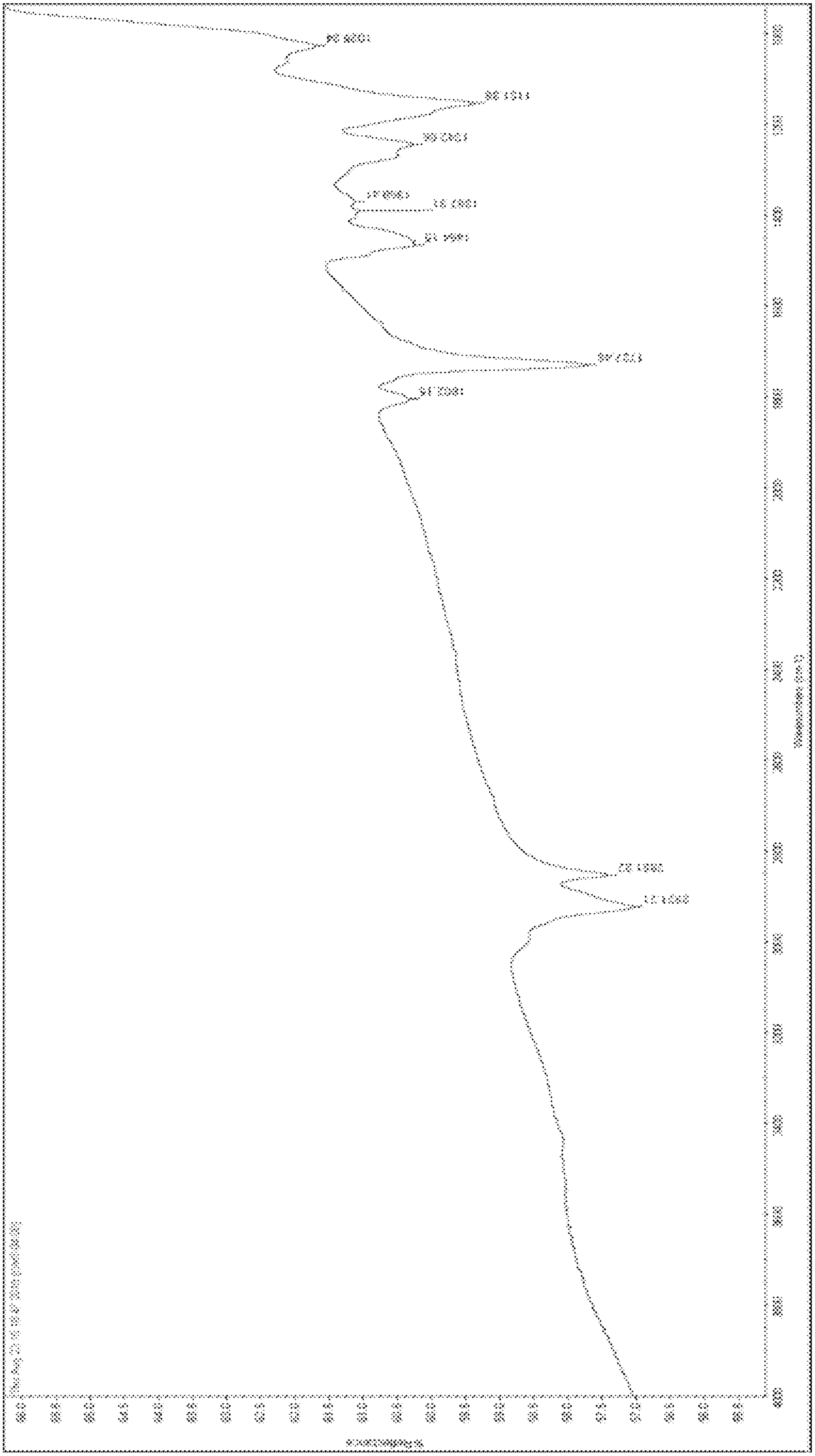

METHOD OF PHOTOGRAFTING ORGANIC MOLECULES TO METALLIC SUBSTRATES AND DEVICES HAVING PHOTOGRAFTED ORGANIC MOLECULES

CROSS REFERENCE TO RELATED APPLICATIONS

The present application claims the benefit of U.S. Provisional Application Ser. No. 62/785,162 filed 26 Dec. 2018, which is incorporated herein by reference in its entirety.

FIELD

The present disclosure is directed to a method of photografting organic molecules to a metal oxide, an oxidized metal or metal alloy surface, or a polymeric surface including tissue to which a metal oxide or alkoxide intermediate layer has been applied. The photografting method utilizes UV irradiation to functionalize various metals efficiently and effectively to create an active surface facilitating the attachment of reactive organic molecules to the surfaces thereof.

BACKGROUND

Metal oxides functionalized with organic molecules find commercial applications in a variety of fields, including as biosensors, in medical devices and energy conversion devices. For example, biosensors are designed to determine the presence of biomolecules and are often used in biotechnology industries to perform rapid biochemical analysis. Conventional schemes for functionalizing metal oxides, such as $TiO_2$, use organic molecules having functional groups such as phosphonic acids, carboxylic acids, esters, acid chlorides, carboxylate salts, amides, silanes, ethers, acetylacetonates, and salicylates.[1]

Additionally, covalent surface modification of oxide surfaces have also been studied, where oxide surfaces are broadly defined as any material represented as $MO_x$ where M can be a metal, a semiconductor or a material that has an oxygen-free bulk, and which can form surface bound hydroxy groups upon exposure to air or upon appropriate activation (e.g., exposure to oxygen plasma).[2] Various organic molecules, such as amines, alcohols (including catechol), alkenes and alkynes can be used to functionalized such active, oxide surfaces.

Each choice of chemistry for functionalizing metal surfaces has certain advantages and disadvantages. For example, the most common strategy to modify oxide surfaces includes the use of silanes and carboxylates based on their ease of application. However, silanes show poor hydrolytic stability and carboxylate bonding layers are even weaker and more labile.

Similarly, phosphonates and phosphinates form exceptionally strong and stable attachments to oxide layers but are difficult to solubilize in an appropriate solvent, resulting in problems with chemisorption during the attachment process. Moreover, phosphorous-based moieties often require heat to drive coupling reactions to form covalent attachments to oxide surfaces. Using heat to facilitate the coupling reaction for phosphonates, and other molecules that require heat-based attachment processes, can be a detriment if the functional groups which they carry to the attachment sites are sensitive to degradation or denaturation. Additionally, certain substrates may also be heat sensitive (for example, finished devices which contain sensitive electronics). For at least these reasons, there is great interest in methods which drive attachment without needing heat.

Photografting is one such attachment method that does not require heat. Photografting is a surface modification process that uses light, instead of heat, to drive the chemical, covalent attachment of target molecules to oxide surfaces. The light energy produces an activated state in the target molecule, the substrate or both, which allow for covalent bonds to be formed between the target molecule and the substrate.

A typical procedure would entail application of a thin film of material onto an oxide surface followed by placement of that surface into an oxygen-free environment and irradiation with light energy for a specific amount of time at a particular intensity in order to effect bonding between the surface and the molecules of the thin film. Many oxide layers, especially those of titanium are activated by UV irradiation while other materials and thin films are activated by visible light. No external heating is required to drive chemical attachment although some processes may be enhanced by the application of heat.

Studies on the photochemical attachment of alkenes and alkynes to oxide surfaces, including $TiO_2$, have been previously carried out.[3] In these studies, it was determined that under UV light at wavelengths of about 254 nm, alkenes and alkynes can be attached to titanium oxide crystals. However, good surface modification required exposure times in excess of 12 hours. Thus, a need still exists for a heatless attachment process for metal oxides with shorter attachment times and broader availability of attachment motifs, which the inventor of this application aims to address.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

While certain aspects of conventional technologies have been discussed to facilitate this disclosure, the inventors of this application in no way disclaim these technical aspects, and it is contemplated that the claims may encompass or include one or more of the conventional technical aspects discussed herein.

SUMMARY

The present disclosure addresses the need for a photochemical attachment process using UV radiation as a primary energy source for metal oxides with shorter attachment times and broader availability of attachment motifs. The photochemical attachment process may include residual thermal energy from a secondary heat source. The functionalized metal oxides described in this application may be used alone or as coatings on a substrate, and can be used in a variety of devices, including as biosensors, in dye sensitized solar cells, in medical devices and energy conversion devices.

Some exemplary embodiments are directed to a method of photografting organic molecules to a metal oxide comprising: (a) contacting the metal oxide with an acrylate or a derivative thereof; and (b) exposing the metal oxide and the acrylate or the derivative thereof to a light to form covalent bonds between the metal oxide and the acrylate or the derivative thereof.

Some embodiments are directed to a method of photografting organic molecules to a metal oxide comprising: (a) contacting a substrate having a metal oxide layer on a surface thereof with an acrylate, derivative thereof or a photolabile functional group; and (b) exposing the metal oxide layer and the acrylate, derivative thereof or photolabile functional group to UV or visible radiation to form covalent bonds between the metal oxide and the acrylate, the derivative thereof or the photolabile functional group.

In some exemplary embodiments, the metal oxide is an oxide of a metal selected from the group consisting of titanium, cobalt, zinc, zirconium, iron, tin, aluminum iron, tantalum, and alloys thereof.

In some exemplary embodiments, the metal oxide is selected from the group consisting of $TiO_2$, ZnO, $ZrO_2$, $SnO_2$, and FeO.

In some exemplary embodiments, the acrylate or the derivative thereof has the following Formula I:

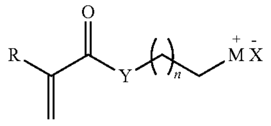

wherein R is H or a C1-C12 alkyl; M is selected from the group consisting of a hydroxyl, amino or an optionally substituted heteroaryl, an optionally substituted fluorinated or per-fluorinated organic compound, an optionally substituted amino acid, a peptide, a protein, a nucleotide, or an oligonucleotide; X is a Cl, Br, I, trifluorosulfonate (OTf), methylsulfonate (OMs) or toylysulfonate (OTs); Y is O or NR', wherein R' is H, a C1-C6 alkyl, or an aryl; and n is an integer between 1 and 16.

In some exemplary embodiments, R is H or methyl.

In some exemplary embodiments, Y is O.

In some exemplary embodiments, M is selected from the group consisting of hydroxyl, ammonium, phosphonium, an optionally substituted heteroaryl, an optionally substituted iodo, an optionally substituted fluorinated or per-fluorinated organic compound, an optionally substituted amino acid, a peptide, a protein, a nucleotide, and an oligonucleotide In some exemplary embodiments, M is the optionally substituted heteroaryl is selected from the group consisting of pyridine and imidazole.

In some exemplary embodiments, M is a hydroxyl.

In some exemplary embodiments, M is a trialkyl ammonium.

In some exemplary embodiments, M is a quaternary ammonium.

In some exemplary embodiments, M is a quaternary phosphonium.

In some exemplary embodiments, X is Cl or Br.

In some exemplary embodiments, the light is UV or visible light.

In some exemplary embodiments, the light is UV light having a wavelength of between about 220 and 385 nm. In a preferred embodiment, the UV light has a wavelength of about 254 nm.

In some exemplary embodiments, the light is visible light having a wavelength of between about 380 nm to about 780 nm.

In some exemplary embodiments, the metal oxide and the acrylate, derivative thereof, or photolabile group are exposed to the light for less than 20 minutes. In a preferred embodiment, the metal oxide and the acrylate, derivative thereof, or photolabile group are exposed to the light for less than 5 minutes.

In some exemplary embodiments, the metal oxide and the acrylate, derivative thereof, or photolabile group are exposed to the light in an inert atmosphere.

In some exemplary embodiments, the acrylate, derivative thereof, or photolabile group is in the form of an aerosolized spray.

Details of other exemplary embodiments of the present disclosure will be included in the following detailed description and the accompanying drawings.

BRIEF DESCRIPTION OF DRAWINGS

The FIGURE is an infrared spectrum showing the characteristic peaks for the methacrylate ester and the alkyl chain attached to the surface of the oxidized titanium surface of Example 1.

DETAILED DESCRIPTION

Advantages and features of the present disclosure, and methods for accomplishing the same will be more clearly understood from exemplary embodiments described below with reference to the accompanying drawings. However, the present disclosure is not limited to the following exemplary embodiments and may be implemented in various forms. The exemplary embodiments are provided only to complete disclosure of the present disclosure and to fully provide a person having ordinary skill in the art to which the present disclosure pertains, and the present disclosure will be defined by any appended claims and combinations thereof.

Shapes, sizes, ratios, angles, numbers, and the like shown in the accompanying drawings are merely exemplary, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. Terms such as “including,” “having,” and “consisting of” used herein are generally intended to allow other components to be included unless the terms are used in conjunction with the term “only.” Any references to the singular may include the plural unless expressly stated otherwise.

Components are interpreted to include an ordinary error range even if not expressly stated.

The term “about” includes the referenced numeric indication ±10% of that referenced numeric indication.

As used herein, the singular forms “a,” “an” and “the” are intended to include the plural forms as well, unless the context clearly indicates otherwise. Additionally, the use of “or” is intended to include “and/or,” unless the context clearly indicates otherwise.

When the positional relation between two parts is described using the terms such as “on,” “above,” “below,” and “next,” one or more parts may be positioned between the two parts unless the terms are used in conjunction with the term “immediately” or “directly.”

When an element or layer is referred to as being “on” another element or layer, the element or layer may be directly on the other element or layer, or intervening elements or layers may be present.

Although the terms “first,” “second,” and the like are used for describing various components, these components are not confined by these terms. These terms are merely used for distinguishing one component from the other components, and a first component may be a second component in a technical concept of the present disclosure.

The term “secondary heat source” may include, but is not limited to, electrochemical heat, photochemical heat, inductive heat, and the like, including any combinations thereof.

The size and thickness of each component illustrated in the drawings are represented for convenience of explanation, and the drawings are not necessarily to scale.

The features of various embodiments of the present disclosure can be partially or entirely bonded to or combined with each other and can be interlocked and operated in various technical ways, and the embodiments can be carried out independently of, or in association with, each other.

Hereinafter, various exemplary embodiments of the present disclosure will be described in detail with reference to the accompanying drawings.

The present disclosure is directed to a rapid and efficient method for the chemical attachment of organic molecules to the surface of various oxide surfaces including those of metals. Historically, chemical modification of metal surfaces, including titanium, has been exceedingly difficult and tedious. Such conventional methods comprise slow evaporation to facilitate chemisorption of organic molecules to a metal or oxidized metal surface, followed by a long bake sometimes lasting multiple days. In comparison, by using photochemical induction, as described in this application, covalent bonds can be formed efficiently and effectively between the surface and reactive organic components.

As described by Weber et al.[4], diazirine chemistry can be used to photo-generate carbenes, which are then inserted into O—H bonds formed on the surface of titanium oxide surfaces, resulting in glycosylated surfaces. Further, Hamers et al.[5] describes photocatalytic immobilization of alkenes and alkynes to titanium surfaces to immobilize light sensitive dyes in solar cells.

An exemplary method of photografting organic molecules to a metal oxide includes the steps of contacting the metal oxide with an organic molecule and exposing the metal oxide and the organic molecule to an UV light for a sufficient period of time to form covalent bonds between the metal oxide and the organic molecule.

An exemplary method of photografting organic molecules to a metal oxide includes the steps of contacting a substrate having a metal oxide layer on a surface thereof with an acrylate, derivative thereof or a photolabile functional group, and exposing the metal oxide layer and the acrylate, derivative thereof or photolabile functional group to UV or visible radiation for a sufficient period of time to form covalent bonds between the metal oxide and the acrylate, the derivative thereof or the photolabile functional group.

A photolabile surface or compound is one that is put into an activated state by the application of light which allows that surface or compound to participate in a chemical reaction. Examples of photolabile compounds include titanium oxide, acrylates, methacrylates, alkenes, alkynes, conjugated alkenes or alkynes, aromatics, conjugated aromatics, heteroaryl, and benzophenones, among others.

The organic molecule to be attached to the metal oxide includes any molecular system that readily forms radicals. Such functional groups may include, but are not limited to, substituted or unsubstituted aromatics, substituted or unsubstituted iodo compounds, substituted or unsubstituted benzylic systems, substituted or unsubstituted bridged ring-strain systems, substituted or unsubstituted cyclopropyl compounds, substituted or unsubstituted acrylates, substituted or unsubstituted urethanes, substituted or unsubstituted pyridines, substituted or unsubstituted pyrimidines, substituted or unsubstituted purines, substituted or unsubstituted thiols, substituted or unsubstituted conjugated thiols, substituted or unsubstituted phosphonic acids, substituted or unsubstituted carboxylic acids, substituted or unsubstituted esters, substituted or unsubstituted acid chlorides, substituted or unsubstituted carboxylate salts, substituted or unsubstituted amides, substituted or unsubstituted silanes, substituted or unsubstituted ethers, substituted or unsubstituted acetylacetonates, substituted or unsubstituted salicylates, and the like.

In a preferred embodiment, the organic molecule is selected from the group consisting of substituted or unsubstituted phosphonic acids, substituted or unsubstituted carboxylic acids, substituted or unsubstituted esters, substituted or unsubstituted acid chlorides, substituted or unsubstituted carboxylate salts, substituted or unsubstituted amides, substituted or unsubstituted urethanes, substituted or unsubstituted ureas, substituted or unsubstituted silanes, substituted or unsubstituted ethers, substituted or unsubstituted acetylacetonates, substituted or unsubstituted salicylates, and substituted or unsubstituted acrylates.

In some embodiments, the organic molecule is an acrylate or a derivative thereof.

In some embodiments, the organic molecule is brought into contact with the surface to be functionalized in an aerosolized form.

In some embodiments, the radical forming system has the following formula I:

(I)

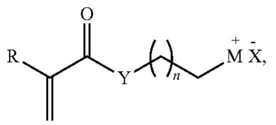

wherein R is H or a C1-C12 alkyl; M is selected from the group consisting of hydroxyl, ammonium, phosphonium, an optionally substituted heteroaryl, an optionally substituted iodo, an optionally substituted fluorinated or per-fluorinated organic compound, an optionally substituted amino acid, a peptide, a protein, a nucleotide, and an oligonucleotide; X is a Cl, Br, I, trifluorosulfonate (OTf), methylsulfonate (OMs) or toylysulfonate (OTs); Y is O or NR', wherein R' is H, a C1-C6 alkyl, or an aryl; and n is an integer between 1 and 16, inclusive.

In some embodiments, R is H or methyl.

In some embodiments, Y is O.

In some embodiments, M is selected from the group consisting of pyridine, hydroxyl, ammonium, phosphonium, and imidazole.

In some embodiments, X is Cl or Br.

In some embodiments, is H or methyl; Y is O, M is pyridine or imidazole; and X is Cl or Br.

In some embodiments, the material of the substrate is selected from the group consisting of metals, metal alloys and oxides thereof. The metal oxide can be formed on the surface of a metal or an alloy.

In some embodiments, the material of the substrate is selected from the group consisting of Ti, Zr, Hf, V, Nb, Ta, Al, alloys thereof, and oxides of the metal and metal alloys, including stainless steel. In some embodiments, the material of the substrate is selected from the group consisting of $TiO_2$, $ZnO$, $ZrO_2$, $SnO_2$, $CrO_2$, $Fe_xO_y$, $Ta_xO_y$, $WO_3$, and $Al_2O_3$. In some embodiments, the material of the substrate is selected from the group consisting of titanium, titanium alloys, aluminum and aluminum alloys.

In some embodiments, the metal oxide is $TiO_2$. Titanium as a material for orthopedic implants has many advantages. Titanium has a low elastic modulus, is corrosion resistant, and its stable oxide layer makes it relatively inert in the body, as well as biocompatible.

The characteristics of the metal oxide may vary. The metal oxide can be doped or undoped and in any form or shape. For example, the metal oxide, native or otherwise, can be a uniform surface or randomly distributed on a metal surface. The thickness of the metal oxide film may vary. In some embodiments, the metal oxide provides a non-porous structure. In some embodiments, the metal oxide is single-crystalline. In some embodiments, the metal oxide is polycrystalline. In still other embodiments, the metal oxide provides a nanocrystalline porous structure. The porous structures provide a greater surface area for attaching organic molecules as compared to non-porous structures having similar dimensions and thicknesses.

In some embodiments, the metal oxide takes the form of a film disposed on the surface of a substrate. In such embodiments, the functionalized metal oxide provides a coating for the substrate. A variety of substrates may be used, including, but not limited to a device, glass, plastic, polymers, and the like, and may be transparent. When the substrate is a plastic, a variety of plastics may be used, including, but not limited to polycarbonates and polyacrylics. When the substrate is a polymer, a variety of polymers may be used, including, but not limited to, collagen and tissue.

The substrate may optionally include a metal alkoxide as an intermediate layer on the surface of the substrate prior to photocatalytic modification. In an exemplary embodiment, the material of the intermediate layer includes alkoxides of titanium, zinc, zirconium, tin, chromium, iron, tantalum, tungsten and aluminum. In some embodiments, the alkyl group is a substituted or unsubstituted, a straight-chain or branched, C1-6 alkyl. In some embodiments, the material of the intermediate layer is selected from titanium t-butoxide, titanium isopropoxide, zirconium t-butoxide and zirconium isopropoxide.

In an exemplary embodiment, the UV light has a wavelength of between about 150 and about 385 nm. In some embodiments, the UV light has a wavelength of about 150 nm, about 155 nm, about 160 nm, about 170 nm, about 180 nm, about 190 nm, about 200 nm, about 210 nm, about 220 nm, about 230 nm, about 240 nm, about 241 nm, about 242 nm, about 243 nm, about 244 nm, about 245 nm, about 246 nm, about 247 nm, about 248 nm, about 249 nm, about 250 nm, about 251 nm, about 252 nm, about 253 nm, about 254 nm, about 255 nm, about 256 nm, about 257 nm, about 258 nm, about 259 nm, about 260 nm, about 261 nm, about 162 nm, about 163 nm, about 264 nm, about 265 nm, about 266 nm, about 267 nm, about 268 nm, about 269 nm, about 270 nm, about 280 nm, about 290 nm, about 300 nm, about 310 nm, about 320 nm, about 330 nm, about 340 nm, about 350 nm, about 360 nm, about 370 nm, about 375 nm, about 380 nm, or about 385 nm. One or more wavelengths can be used separately or simultaneously.

In some embodiments, the photografting is carried out using visible light having a wavelength between about 380 nm and about 780 nm. In some embodiments, the visible light has a wavelength of about 380 nm, about 390 nm, about 400 nm, about 410 nm, about 420 nm, about 430 nm, about 440 nm, about 450 nm, about 460 nm, about 470 nm, about 480 nm, about 490 nm, about 500 nm, about 510 nm, about 520 nm, about 530 nm, about 540 nm, about 550 nm, about 560 nm, about 570 nm, about 580 nm, about 590 nm, about 600 nm, about 610 nm, about 620 nm, about 630 nm, about 640 nm, about 650 nm, about 660 nm, about 670 nm, about 680 nm, about 690 nm, about 700 nm, about 710 nm, about 720 nm, about 730 nm, about 740 nm, about 750 nm, about 760 nm, about 770 nm, or about 780 nm. One or more wavelengths can be used separately or simultaneously.

In an exemplary embodiment, the metal oxide and the molecular system are exposed to the UV light or visible light for less than about 20 minutes. In some embodiments, exposure time is less than about 19 minutes, less than about 18 minutes, less than about 17 minutes, less than about 16 minutes, less than about 15 minutes, less than about 14 minutes, less than about 13 minutes, less than about 12 minutes, less than about 11 minutes, less than about 10 minutes, less than about 9 minutes, less than about 8 minutes, less than about 7 minutes, less than about 6 minutes, less than about 5 minutes, less than about 4 minutes, less than about 3 minutes, less than about 2 minutes, and less than about 1 minute.

In an exemplar embodiment, the exposure to the UV light or visible light is continuous. In some embodiments, the exposure to the UV light or visible light is intermittent.

In some embodiments, the reaction takes place under an inert atmosphere. In some embodiments, the inert atmosphere is nitrogen or argon.

Example 1

Titanium foil was cut into small 1×2 rectangles, which were cleaned via successive sonications in Alcanox®, ethanol and water. The Ti pieces were extensively washed deionized water between sonications. After the final sonication, the Ti pieces were briefly washed with ethanol and dried under a stream of nitrogen.

A dilute, 1% by weight ethanolic solution of the methacryloyloxydodecal bromide was aerosolized and allowed to encounter the surface of the rectangular Ti pieces and form a thin film of material on the surface. The Ti pieces with the thin film of methacryloyloxydodecal bromide on the surface thereof were placed in a previously purged UV cleaner and exposed to UV light ($\lambda_{max}$=254 nm, I=28 mW/$cm^2$) under argon for 15 minutes followed by a short sonication in ethanol.

As shown in the FIGURE, characteristic peaks for the methacrylate ester and the alkyl chain were seen via infrared spectroscopy to confirm the presence of the molecule on the surface. Test samples were sonicated in ethanol for 2 hours followed by sonication in PBS (phosphate buffered saline) for an additional two hours. IR spectra collected after sonication in PBS for two hours showed no decrease in peak intensities, indicating the robustness of the surface modification.

A further stability test performed by incubating test articles in PBS buffer for two weeks at 37° C. showed no degradation of the corresponding IR peaks. Additionally, a standard ASTM tape test failed to strip the chemistry off the titanium surface.

Example 2

Samples were prepared in the exact same manner as in Example 1, except that the concentration of the ethanolic solution of methacryloyloxydodecal pyridinium bromide (MDPB) was 0.01 g/ml. The functionalized surfaces were analyzed by infrared spectroscopy and were sonicated and stressed in the same way as in Example 1. The stability of the functionalized surfaces of Example 2 was comparable to the stability of the functionalized surfaces of Example 1.

Example 3

Stainless steel coupons were cleaned in the same way as in Example 1. Ethanolic MDPB was applied using a manual spray apparatus to afford a thin film of material on the coupon surfaces. Exposure to UV for 15 minutes fixed the molecule to the surface in the same way as described in Example 1. Infrared spectra confirmed the presence of MDPB pre and post multiple sonications in ethanol and PBS.

Example 4

Circular anodized coupons (1×15 mm) of titanium alloy (Ti6Al4V) were cleaned as described in Example 1. A 1 wt % ethanolic solution of MDPB was lightly sprayed onto the surfaces of the coupons to form a thin film. The coupons were then placed into a nitrogen purged chamber and irradiated with UV light ($\lambda_{max}$=254 nm, I=28 mW/$cm^2$) for 15 minutes. They functionalized coupons were then sonicated twice for 15 minutes in ethanol to remove any unbound material. IR spectroscopy confirmed the presence of the bound molecule.

Although the exemplary embodiments of the present disclosure have been described in detail with reference to the accompanying drawing and examples, the present disclosure is not limited thereto and may be embodied in many different forms without departing from the technical concept of the present disclosure. Therefore, the exemplary embodiments of the present disclosure are provided for illustrative purposes only and are not intended to limit the technical concept of the present disclosure. The protective scope of the present disclosure should be construed based on any appended claims and combinations thereof, and all the technical concepts in the equivalent scope thereof should be construed as falling within the scope of the present disclosure. As various changes could be made in the above methods and compositions without departing from the scope of the disclosure, it is intended that all matter contained in the above description shall be interpreted as illustrative and not in a limiting sense. Other embodiments within the scope of the claims herein will be apparent to one skilled in the art from consideration of the specification or practice of the present disclosure. It is intended that the specification be considered exemplary only, with the scope and spirit of the disclosure as described herein and in the claims.

REFERENCES

1. GALOPPINI, Coordination Chemistry Reviews (2004), 245, 1283-1297
2. ZUILHOF et al., Angew. Chem. Int. Ed. (2014), 53, 2-36.
3, 5. HAMERS et al., Langmuir (2009), 25(18), 10676-10684.
4. WEBER et al., Helvetica Chimica Acta (1998), 81, 1359-1372.

The invention claimed is:

1. A method of photografting organic molecules to a metal oxide comprising:
   (a) contacting a substrate having a metal oxide layer on a surface thereof with an acrylate; and
   (b) exposing the metal oxide layer and the acrylate to UV radiation to form direct covalent bonds between the metal oxide and the acrylate.

2. The method of claim 1, wherein the metal oxide is an oxide of a metal selected from the group consisting of titanium, cobalt, zinc, zirconium, iron, tin, aluminum iron, tantalum, and alloys thereof.

3. The method of claim 2, wherein the metal oxide is selected from the group consisting of $TiO_2$, ZnO, $ZrO_2$, $SnO_2$, and FeO.

4. The method of claim 1, wherein the acrylate has Formula I:

(I)

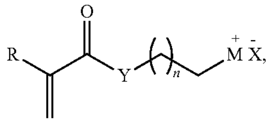

wherein:
   R is H or a C1-C12 alkyl;
   M is selected from the group consisting of an ammonium, a phosphonium, an optionally substituted heteroaryl, an optionally substituted fluorinated or per-fluorinated organic moiety, an optionally substituted amino acid, a peptide, a protein, a nucleotide, and an oligonucleotide;
   X is a Cl, Br, I, trifluorosulfonate (OTf), methylsulfonate (OMs), or toylysulfonate (OTs);
   Y is O or NR', wherein R' is H, a C1-C6 alkyl, or an aryl; and
   n is an integer from 1 to 16.

5. The method of claim 4, wherein R is H or methyl.

6. The method of claim 4, wherein Y is O.

7. The method of claim 4, wherein M is selected from the group consisting of pyridine, ammonium, phosphonium, and imidazole.

8. The method of claim 4, wherein X is Cl or Br.

9. The method of claim 1, wherein the UV radiation has a wavelength of from about 220 to about 385 nm.

10. The method of claim 9, wherein the UV radiation has a wavelength of about 254 nm.

11. The method of claim 1, wherein the metal oxide and the acrylate are exposed to the UV radiation for less than 20 minutes.

12. The method of claim 11, wherein the metal oxide and the acrylate are exposed to the UV radiation for less than 5 minutes.

13. The method of claim 1, wherein the metal oxide and the acrylate are exposed to the UV radiation in an inert atmosphere.

14. The method of claim 1, wherein the acrylate is in the form of an aerosolized spray.

15. The method of claim 1, wherein the UV radiation is a primary energy source, and the method optionally comprises residual thermal energy from a secondary heat source.

16. A method of photografting organic molecules to a metal alkoxide comprising:
   (a) providing a substrate having a surface;
   (b) forming an intermediate layer comprising a metal alkoxide on the surface of the substrate;
   (c) contacting the substrate having a metal alkoxide layer on the surface with an acrylate; and
   (d) exposing the metal alkoxide layer and the acrylate to UV radiation to form direct covalent bonds between the metal alkoxide and the acrylate.

17. The method of claim 16, wherein the metal alkoxide is selected from the group consisting of alkoxides of titanium, zinc, zirconium, tin, chromium, iron, tantalum, tungsten, and aluminum.

18. The method claim 17, wherein the metal alkoxide is selected from the group consisting of titanium t-butoxide, titanium isopropoxide, zirconium t-butoxide, and zirconium isopropoxide.

* * * * *